(12) United States Patent
Kim et al.

(10) Patent No.: US 8,711,829 B2
(45) Date of Patent: Apr. 29, 2014

(54) METHOD AND APPARATUS FOR ERROR CORRECTION IN MBMS RECEIPT SYSTEM

(75) Inventors: Jung-Im Kim, Daejon (KR); Jae-Heung Kim, Daejon (KR); Kyoung-Seok Lee, Daejon (KR); Byung-Han Ryu, Daejon (KR); Seung-Chan Bang, Daejon (KR)

(73) Assignees: Electronics and Telecommunications Research Institute, Daejeon (KR); SK Telecom Co., Ltd, Seoul (KR); KT Corporation, Seongnam (KR)

( * ) Notice: Subject to any disclaimer, the term of this patent is extended or adjusted under 35 U.S.C. 154(b) by 1426 days.

(21) Appl. No.: 12/089,352

(22) PCT Filed: Oct. 2, 2006

(86) PCT No.: PCT/KR2006/003967
§ 371 (c)(1),
(2), (4) Date: Apr. 4, 2008

(87) PCT Pub. No.: WO2007/040330
PCT Pub. Date: Apr. 12, 2007

(65) Prior Publication Data
US 2008/0240011 A1 Oct. 2, 2008

(30) Foreign Application Priority Data
Oct. 5, 2005 (KR) .................. 10-2005-0093373
Feb. 27, 2006 (KR) .................. 10-2006-0018651

(51) Int. Cl.
*H04J 3/00* (2006.01)
*H04L 12/26* (2006.01)
*H04J 3/24* (2006.01)
*G06F 11/00* (2006.01)
*H03M 13/00* (2006.01)

(52) U.S. Cl.
USPC ............ 370/345; 370/235; 370/349; 714/18; 714/752

(58) Field of Classification Search
USPC ............ 370/345, 349, 239; 714/752, 18
See application file for complete search history.

(56) References Cited

U.S. PATENT DOCUMENTS 7,031,257 B1 * 4/2006 Lu et al. .................. 370/235
2001/0007137 A1 * 7/2001 Suumaki et al. ............ 714/18
(Continued)

FOREIGN PATENT DOCUMENTS

| KR | 10-2000-0065674 | 11/2000 |
| KR | 10-2002-0028095 | 4/2002 |
| KR | 10-0446502 | 8/2004 |

OTHER PUBLICATIONS

Office Action issued by Korean Intellectual Property Office on Dec. 15, 2008.

(Continued)

*Primary Examiner* — Ian N Moore
*Assistant Examiner* — Kiet Tang
(74) *Attorney, Agent, or Firm* — Kile Park Reed & Houtteman PLLC

(57) ABSTRACT

Provided is an error correcting method that can provide improved error correction efficiency in a multimedia broadcast/multicast service (MBMS) by marking the presence of an error in a Protocol Data Unit (PDU) with an error instead of discarding the erroneous PDU in an MBMS terminal of the MBMS system, which performs error correction in an application layer, and transmitting the erroneous PDU together with a PDU without an error to the application layer, and an error correction apparatus employing the method. The MBMS terminal includes: a radio link control (RLC) protocol processor configured to receive PDUs generated from the reception data, generate service data units (SDUs) by combining the PDUs, mark whether there is an SDU recovered from a PDU with an error, and output the SDUs; and a packet data convergence protocol (PDCP) processing means configured to receive and deliver the SDUs.

25 Claims, 5 Drawing Sheets

(56) References Cited

U.S. PATENT DOCUMENTS

| | | |
|---|---|---|
| 2004/0057387 A1 | 3/2004 | Yi et al. |
| 2004/0116139 A1 | 6/2004 | Yi et al. |
| 2004/0180681 A1 | 9/2004 | Jeong et al. |
| 2005/0138530 A1 | 6/2005 | Huang et al. |
| 2005/0193309 A1* | 9/2005 | Grilli et al. .................. 714/752 |
| 2006/0072538 A1* | 4/2006 | Raith ........................... 370/349 |

OTHER PUBLICATIONS

A International Search Report PCT/KR2006/003967 dated Jan. 12, 2007.

"SDU Reassembly Scheme for MBMS", 3GPP TSG RAN WG2 #51, pp. 1-3, Feb. 13-17, 2006.

* cited by examiner

METHOD AND APPARATUS FOR ERROR CORRECTION IN MBMS RECEIPT SYSTEM

TECHNICAL FIELD

The present invention relates to an error correction method and apparatus in a multimedia broadcast/multicast service (MBMS) receiving system; and, more particularly, to a method for correcting an error of a reception signal in an MBMS terminal which receives an MBMS service, and an apparatus thereof.

BACKGROUND ART

The multimedia broadcast/multicast service (MBMS) is a service that provides broadcasting and multicasting services to mobile phones. The $3^{rd}$ Generation Partnership Project (3GPP), which is a standardization group for the Wideband Code Division Multiple Access (WCDMA) system, is working on the standardization of the MBMS.

In the 3GPP WCDMA system, both transmitting part and receiving part are composed of an application layer, a plurality of middle layers, and a physical layer. In the transmitting part, data signals are transmitted and processed in a sequence of the application layer, the middle layers, and the physical layer. In the receiving part, data signals are transmitted and processed in a sequence of the physical layer, the middle layers, and the application layer.

Signals that pass through a wireless channel, such as a mobile phone, may have diverse errors due to fading and interference signals in the wireless channel. Conventional WCDMA systems use turbo codes of the physical layer as forward error correction codes to correct errors in the wireless channel, perform encoding in a transmitter of the physical layer, and perform decoding in a receiver.

After the encoding is performed in the transmitter, a Cyclic Redundancy Check (CRC) bit is added. The receiver decodes the signals received through the wireless channel, and performs the CRC checking with a hard bit, which is a result of decoding, to check whether there is an error in the decoding result.

A data transmission method based on a 3GPP Transport Specification (TS) 25.322 Radio Link Control (RLC), which is one of the conventional WCDMA specifications, is composed of an unacknowledged mode (UM), an acknowledged mode (AM), and a transparent mode (TM). The RLC Protocol specification specifies that data with a CRC error is to be discarded in the unacknowledged mode and the acknowledged mode. Therefore, an MBMS receiving system which uses the unacknowledged mode and receives an MBMS service discards the PDU with a CRC error according to the RLC protocol specification.

When a conventional WCDMA system Release-6 receives another service which is not an MBMS service, it performs power control, adaptive modulation and coding (AMC) or hybrid automatic repeat request (HARQ) to overcome the error of the wireless channel.

In short, in case of a real-time service, power control or soft handover is used, and the error correction code for correcting an error is used only in the physical layer. In case of a non-real time service, AMC or HARQ is used and the error correction code for correcting an error is used only in the physical layer.

However, since the MBMS service provides the same signals to a plurality of users, the power controlling method, AMC and HARQ cannot be used. The MBMS system has an enhanced error occurrence probability for those with a poor wireless channel environment. Thus, the MBMS system requires another error correction technology, which is different from the conventional error correction technology described above.

In response to the demand, a technology of encoding data with raptor codes and decoding the data in the application layer of an MBMS terminal is adopted as a standard technology for error correction of the MBMS systems in June 2005.

FIG. 1 shows an exemplary view of an MBMS protocol. As shown in FIG. 1, MBMS services are categorized into a streaming service and a download service.

In case of the streaming service, the RLC upper layer is composed of a packet data convergence protocol (PDCP), an Internet Protocol (IP), a User Datagram Protocol (UDP), and a Real Time transport Protocol (RTP).

In case of the download service, the RLC upper layer is composed of a PDCP, an IP, a UDP, and a File Delivery over Unidirectional Transport (FLUTE) protocol.

In the streaming service, raptor encoding and decoding are carried out in the RTP layer, while they are performed in the FLUTE layer in the download service. The position of the raptor codes in the application layer can be detected by referring to FIG. 1.

An MBMS bearer is composed of a PDCP, an RLC, a medium access control (MAC), and a physical layer. The PDCP performs a role of compressing a header, and it is specified to be optional in the conventional standard specification. Herein, "optional" means that the element is not essential and it can be realized selectively.

A communication system such as the MBMS system includes a plurality of protocols. An input data unit is referred to as a service data unit (SDU) and an output data unit is referred to as a protocol data unit (PDU) in all protocols.

Protocols of higher layers than the layer of a certain protocol are called protocols of upper layers. In other words, in the respect of the physical layer, the RLC layer and the application layer are upper layers, and in the respect of the RLC layer, the application layer is its upper layer.

The data encoded in the application layer are processed in the middle layers based on the protocols of the middle layers, and inputted to the RLC layer, which is one of the middle layers. An SDU may be segmented into a plurality of PDUs or concatenated with a preceding SDU or the following SDU to thereby form a PDU, or it becomes a PDU without division or concatenation.

A PDU of the RLC layer is inputted to the physical layer based on an MAC protocol. Herein, the input unit is referred to as a transport block. In the physical layer, a CRC bit is added to the transport block, and encoding is carried out with an error correction code. Encoded data are transmitted to the receiving part through a wireless channel.

FIGS. 2 and 3 show block diagrams of an MBMS system to which the present invention is applied. As illustrated in FIGS. 2, presented is an example of a Long-Term Evolution (LTE) Universal Mobile Telecommunications System (UMTS). Although the present embodiment shows a structure where BM-SC 100, which is proprietary to the MBMS service, and an access gateway (aGW) 300 supporting unicast, which is a non-MBMS service, are separated, it is possible to realize the two gateways integrated. MBMS data pass the MBMS gateway 200, and they are transmitted to the terminal 500 though an enhancement node B (eNB) 400, which is a sort of a base station. The physical layer of the terminal 500 receives the data through the wireless channel, performs decoding, and checks a CRC error.

According to the 3GPP Release-6 TS25.322 Specification, the RLC layer of the transmitter creates PDUs by concatenating or segmenting SDUs.

The evolved node B 400, which is the base station, determines the size of the PDUs during the MBMS service. When SDUs are inputted to the RLC layer and an SDU is larger than a PDU, the SDU is segmented to have a size equal to or smaller than the PDU.

If there is an SDU which has arrived before but remains without transmission, it is concatenated with the current SDU to thereby create a PDU.

FIG. 4 is a view showing an example that SDUs are segmented or concatenated to form PDUs. Referring to FIG. 4, the first PDU is created by segmenting an SDU, and the second PDU is created by concatenating and segmenting SDUs.

The PDUs acquire CRC bits added thereto in the physical layer after passing through the MAC layer, go through turbo encoding, and are transmitted to the terminal, which is an MBMS receiving system through a wireless channel.

The physical layer of the terminal performs channel decoding, performs cyclic redundancy checking (CRC) to determine whether there is an error in a packet, and transmits the CRC check result and packets except CRC bits to the RLC layer through the MAC layer.

According to the 3GPP Release-6 Specification (TS25.322 RLC), when the SDUs are combined in the RLC layer of the terminal, PDUs with a CRC error are discarded, and all the SDU included in the discarded PDUs are supposed not to be transmitted to the upper layers, regardless of whether the error has occurred in the SDUs.

To be specific, when a CRC error occurs in the second PDU in FIG. 4, all of the second, third, and fourth SDUs are discarded according to the current RLC specification. Even if an error has occurred only in the third SDU, the second and fourth SDUs are discarded together.

Therefore, the conventional error correction method used in the MBMS terminals has a shortcoming that SDUs without an error therein are discarded and thus radio resources are wasted.

In the conventional 3GPP WCDMA system, the physical layer of the receiver performs error correction with a turbo decoder and then performs a CRC error checking. The RLC layer of the receiver recovers SDUs, which are data to be delivered to the upper layer, from the PDUs. Herein, the SDUs are recovered from PDUs without a CRC error. When a PDU with a CRC error is received, another PDU using an SDU part of which is included in the PDU with a CRC error is discarded, too. Eventually, the error correction technology used in the conventional MBMS system brings about an effect that more errors occur than they actually do in the physical layer, and thus induces an error occurrence environment deteriorated more than it actually is.

Meanwhile, according to the 3GPP Release-6 RLC Specification, the application layer reports an error in the RLC layer on the basis of SDU, and corrects the error of a bursty error channel where errors occur continuously. The error correction codes of an erasure channel may show better performance in a random error channel than in the bursty error channel. The smaller the erasure quantity is, the more excellent the performance becomes. Therefore, it is possible to expect improvement in the error correction efficiency by making the conventional MBMS erasure channel environment random and reducing the quantity of erasure.

DISCLOSURE

Technical Problem

It is, therefore, an object of the present invention to provide a method for correcting an error in a multimedia broadcast/multicast service (MBMS) that can provide an improved error correction efficiency by marking the presence of an error in a Protocol Data Unit (PDU) with an error instead of discarding the erroneous PDU in an MBMS terminal of the MBMS system, which performs error correction in an application layer, and transmitting the erroneous PDU together with a PDU without an error to the application layer, and an error correction apparatus employing the method.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

Technical Solution

In accordance with one aspect of the present invention, there is provided a multimedia broadcast/multicast service (MBMS) terminal capable of correcting an error in reception data in an MBMS receiving system, which includes: a radio link control (RLC) protocol processor configured to receive protocol data units (PDUs) generated from the reception data, generate service data units (SDUs) by combining the PDUs, mark whether there is an SDU recovered from a PDU with an error, and output the SDUs; and a packet data convergence protocol (PDCP) processor configured to receive and deliver the SDUs.

In accordance with another aspect of the present invention, there is provided an MBMS terminal for correcting an error in reception data in an MBMS receiving system, which includes: an SDU recovery unit configured to receive PDUs generated from the reception data, and generate SDUs by combining the PDUs; and an SDU status information creating unit configured to generate SDU status information including information on whether there is an SDU recovered from a PDU with an error.

In accordance with another aspect of the present invention, there is provided a method for correcting an error in reception data in an MBMS receiving system, which includes the steps of: a) receiving PDUs generated from the reception data; b) generating SDUs by combining the PDUs; and c) marking whether there is an SDU recovered from a PDU with an error, and outputting the SDU.

Advantageous Effects

The present invention can reduce the quantity of erasure data which are discarded in the process of error correction and improve an error correction efficiency by marking the presence of an error in erroneous data and transmitting the erroneous data together with data without an error to an application layer in a multimedia broadcast/multicast service (MBMS) terminal of an MBMS system, which performs error correction in the application layer.

DESCRIPTION OF DRAWINGS

The above and other objects and features of the present invention will become apparent from the following description of the preferred embodiments given in conjunction with the accompanying drawings, in which.

BEST MODE FOR THE INVENTION

Figure 1:
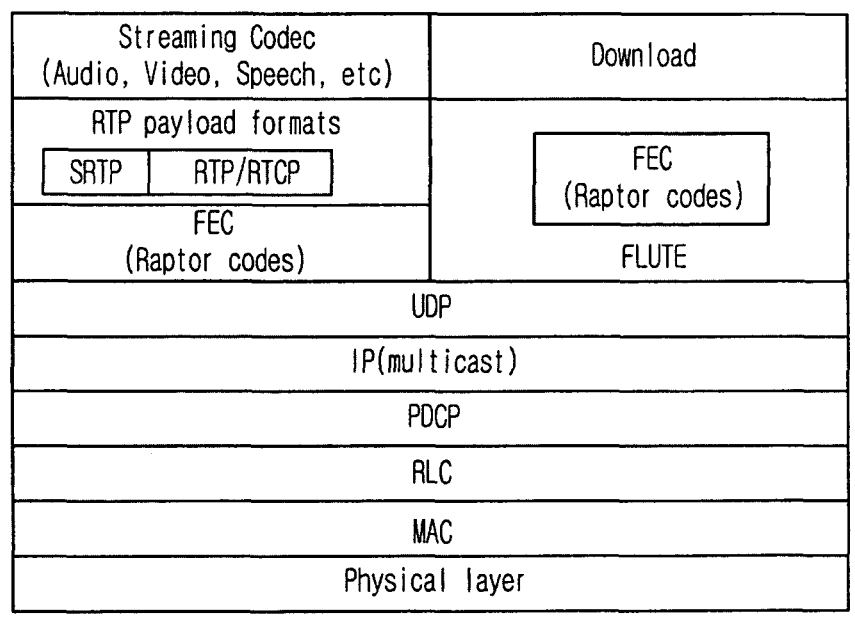
FIG. 1 is an exemplary view showing a multimedia broadcast/multicast service (MBMS) protocol.
Figure 2:
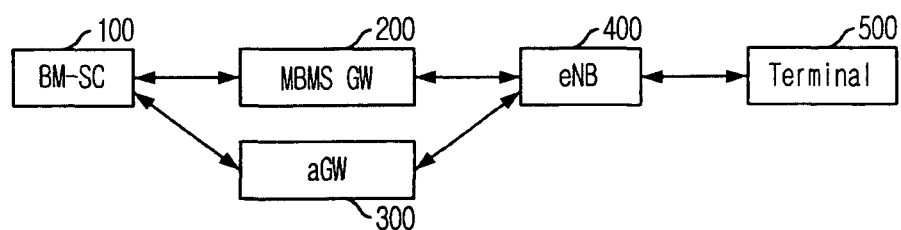
FIG. 2 is a block view describing an MBMS system to which the present invention is applied.
Figure 3:
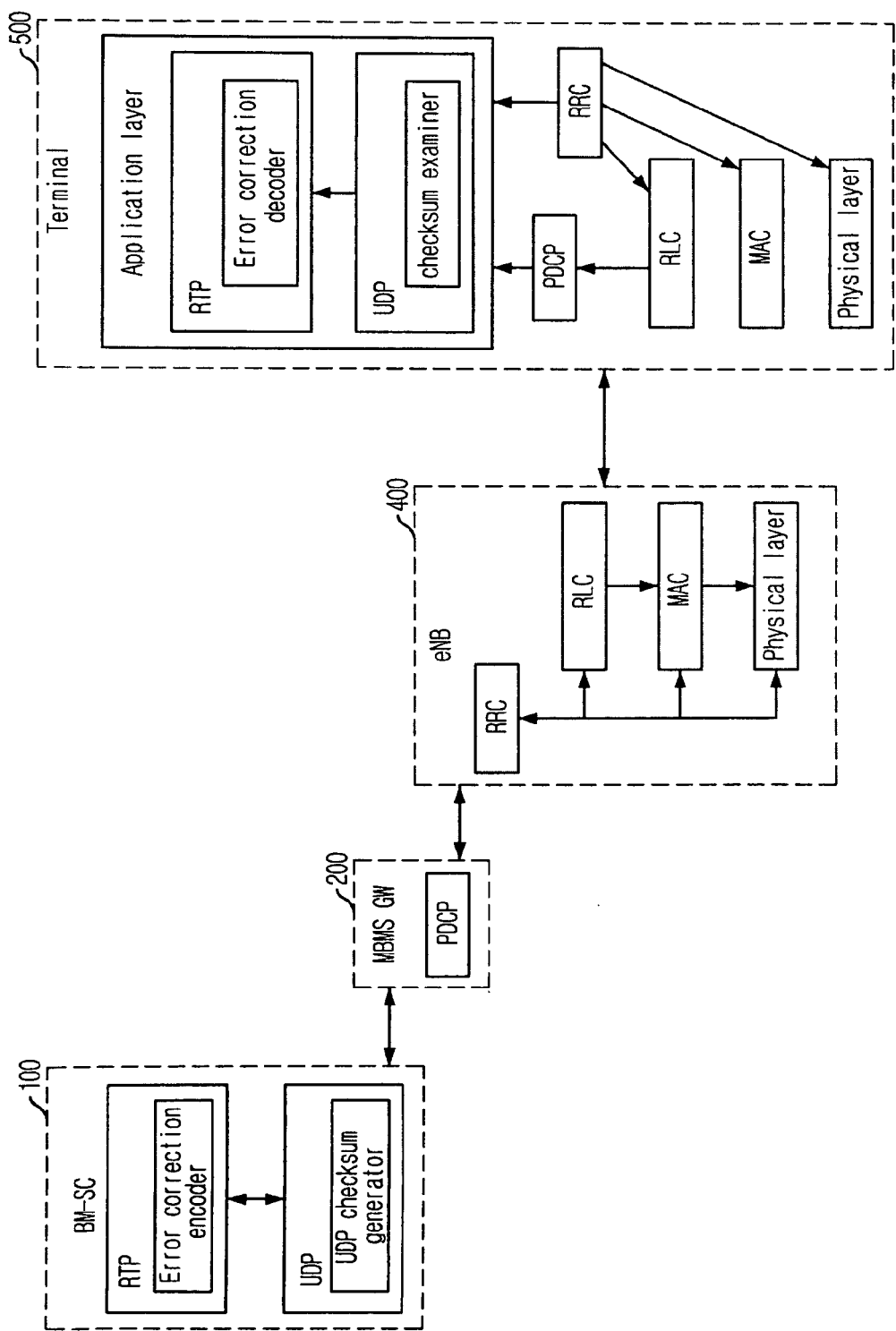
FIG. 3 is a detailed block view illustrating an MBMS system to which the present invention is applied.
Figure 4:
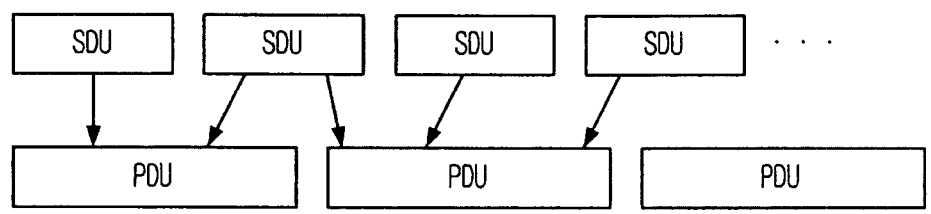
FIG. 4 is a view describing how service data units (SDUs) are segmented or concatenated to form protocol data units (PDUs)

Other objects and aspects of the invention will become apparent from the following description of the embodiments with reference to the accompanying drawings, which is set forth hereinafter. When it is considered that detailed description on related art may obscure the points of the present invention, the description will not be provided herein. Hereinafter, preferred embodiments of the present invention following an overview will be described with reference to the accompanying drawings.

According to the technology of the present invention, a PDU with a Cyclic Redundancy Check (CRC) error is not discarded when SDUs are recovered, the erroneous PDU is marked with an erasure bit and transmitted to an upper layer together with a PDU without an error in the form of SDUs in a system that performs error correction in an application layer of the MBMS system. In other words, when SDUs are to be recovered from PDUs with a CRC error and PDUs without a CRC error in a radio link control (RLC) layer, the PDUs with a CRC error are marked with a erasure bit and the PDUs without a CRC error are processed with a hard bit, which is a decoding result, to recover the SDUs and the recovered SDUs are transmitted to the application layer. Since data are decoded with small erasure bits in the application layer, the performance of the error correction code can be improved.

When data are delivered to the application layer, header checksum is created from the data according to the protocol of the upper layer and then transmitted to the upper layer. Also, packets including information that informs the presence of an error in an SDU and the location of the error are created and transmitted together to have a raptor decoder receive the SDU without a CRC error.

Herein, to prevent the packet from being discarded based on a UDP header checksum test due to the erroneous PDU, a header is decompressed in the Packet Data Convergence Protocol (PDCP), and a header whose packet is not to be discarded in the UDP header checksum checking is created. Packets that should have its UDP header generated are SDU packets included in some PDUs with a CRC error. In short, SDUs extracted from the PDU without a CRC error does not have a UDP header in the PDCP. Also, the PDCP receives status information informing whether there is a PDU with a CRC error for each SDU in the RLC layer, and generates control information packets that can be delivered to an error correction decoding unit through the IP and UDP layers. The error correction decoding unit receives the control information packets, checks whether there is an erasure bit in the data based on the control information packets, and performs decoding.

Errors that occur in the wireless channel are corrected in the physical layer, and then error correction codes are created for a binary erasure channel.

In the binary erasure channel, the performance of the error correction codes are as follows according to an erasure rate, which is disclosed by P. Elias in "Coding for two noisy channels," Information Theory, Academic Press, 1956, pp. 61~74. When the length of an encoding block is X and the erasure probability is p, the maximum performance of the error correction codes is $\log_2 X(1-p)$. That is, the less the data are erased, the more excellent the performance of the error correction codes becomes.

Figure 5:
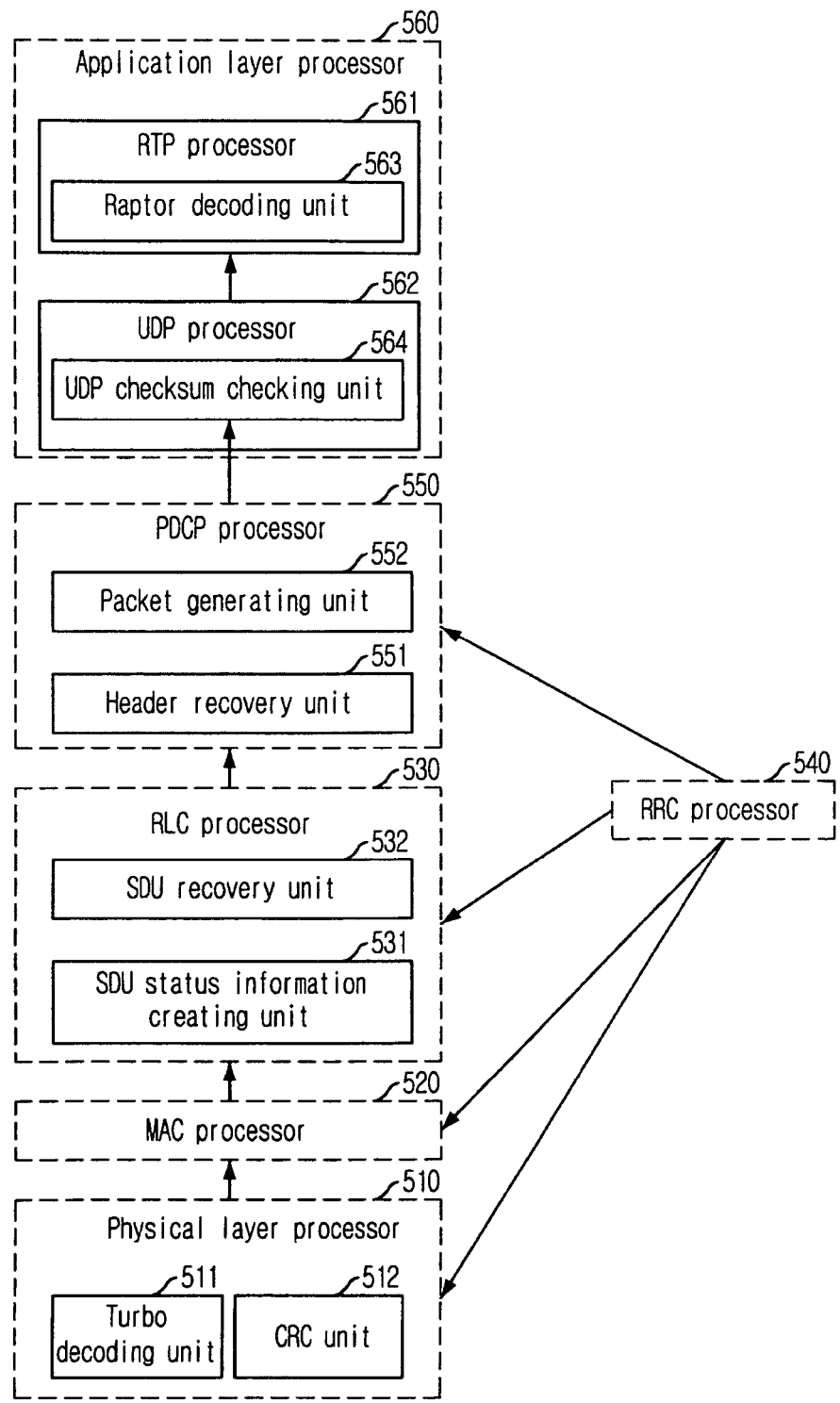
FIG. 5 is a block view showing an MBMS terminal having an error correction function.

FIG. 5 is a block view illustrating an MBMS terminal having an error correction function. As shown in FIG. 5, the MBMS terminal as an MBMS receiving system includes a physical layer processor 510 for performing data processing based on a physical layer protocol, an MAC processor 520 for performing data processing based on an MAC protocol, an RLC processor 530 for performing data processing based on an RLC protocol, a Radio Resource Control (RRC) processor 540 for performing data processing based on an RRC protocol, a PDCP processor 550 for performing processing based on a PDCP protocol, and an application layer processor 560 for performing processing based on an application layer protocol.

The physical layer processor 510 includes a turbo decoding unit 511 and a CRC checking unit 512. The RLC processor 530 includes an SDU recovery unit 532 and an SDU status information creating unit 531. The PDCP processor 550 includes a packet generating unit 552 and a header recovery unit 551. The application layer processor 560 includes an RTP processor 561 having a raptor decoding unit 563, and a UDP processor 562 having a UDP checksum checking unit 564.

The MBMS terminal of the present embodiment adopts a basic structure of a conventional MBMS protocol. Thus, description on the same functional process and structure of the conventional MBMS protocol such as the physical layer processor 510 and the MAC processor 520 will be omitted herein, and the unique structure and operation of the present invention will be described.

The SDU recovery unit 532 of the RLC processor 530 does not discard a PDU with a CRC error and recovers SDUs by being combined with another PDU. The recovered SDUs are outputted to the PDCP processor 550. However, when the erroneous PDU includes an IP header, a UDP header, an RTP header, and/or an FEC payload ID, the erroneous PDU is discarded.

The SDU status information creating unit 531 of the RLC processor 530 creates SDU status information which includes information on whether there is a CRC error in a PDU and position information of the PDU having a CRC error, and transmits the SDU status information to the PDCP processor 550.

The header recovery unit 551 of the PDCP processor 550 recovers the compressed header of an inputted SDU.

The packet generating unit 552 of the PDCP processor 550 forms a UDP checksum such that the SDU passes through a middle layer, and arrives in the raptor decoding unit 563 of the application layer processor 560. For example, packets are not discarded in the UDP checksum checking unit 564 of the UDP processor 562. Also, the packet generating unit 552 generates a packet header to deliver the SDU status information inputted from the RLC processor 530 to the raptor decoding unit 563.

As described above, the SDU recovery unit 532 of the RLC processor 530 includes an IP header, a UDP header, an RTP header, and/or an FEC payload header, the PDU is discarded. If a packet including the erroneous header is transmitted to the upper layer, the packet may not be inputted to the upper layer properly and the packet may be delivered to another constituent element, or the performance of the raptor decoding unit 563 may be deteriorated. In the present invention, a packet with an error in the header is not transmitted to the upper layer.

That is, when the RLC processor 530 interprets an RLC header of a PDU without a CRC error and recovers SDUs and there is an error occurring in the upper layer, it prevents an erroneous from SDU from being transmitted to the PDCP processor 550 by discarding the erroneous PDU. A packet is composed of a header and a payload. The present invention is applied to a case when an error occurs in part of the payload without an error in the header. The present invention does not correct an IP header or a header which is not a UDP checksum. According to the conventional technology, when a CRC error occurs, an SDU including the CRC error is discarded in the RLC layer. In the present invention, however, when an SDU has a CRC error but does not have a CRC error, the SDU is not discarded and transmitted to the raptor decoding unit 563 by generating an artificial UDP checksum.

When the recovered SDU is transmitted from the RLC processor 530 to the PDCP processor 550, an erasure bit is added thereto. Herein, when a new bit is added as the erasure bit, memory capacity twice as much is required. Therefore, the SDU is transmitted to the upper layer together with SDU status information to reduce the memory capacity requirement in the present invention.

The SDU status information includes the size of the SDU status information, an indicator for informing whether there is a CRC error or not, a bursty or random error indicator, a position of the first erasure PDU, the relative positions of the previous erasure PDU and the next erasure PDU.

The structure of the SDU status information is as shown in Table 1. Since the size of the SDU status information is in proportion to the number of erasure PDUs in an SDU, the size is variable.

TABLE 1

Size of SDU status information
CRC error indicator
Bursty or random error indicator
First CRC error position (FEP)
Difference between first erasure PDU and second erasure PDU
. . .
Positions of current and next erasure PDUs The following Table 2 is an example of SDU status information. The SDU status information includes 8-bit SDU status information, 1-bit CRC error indicator, 1-bit bursty or random error indicator, 4-bit erasure PDU position information. An SDU is composed of 10 PDUs, and CRC errors exist in the second and fourth PDUs. A bursty error is marked as 1 and a random error is marked as 0. Also, when there is a CRC error, it is marked as 1 and in case that there is no error, it is marked as 0.

TABLE 2

00001010
1
0
0010
0010

Figure 6:
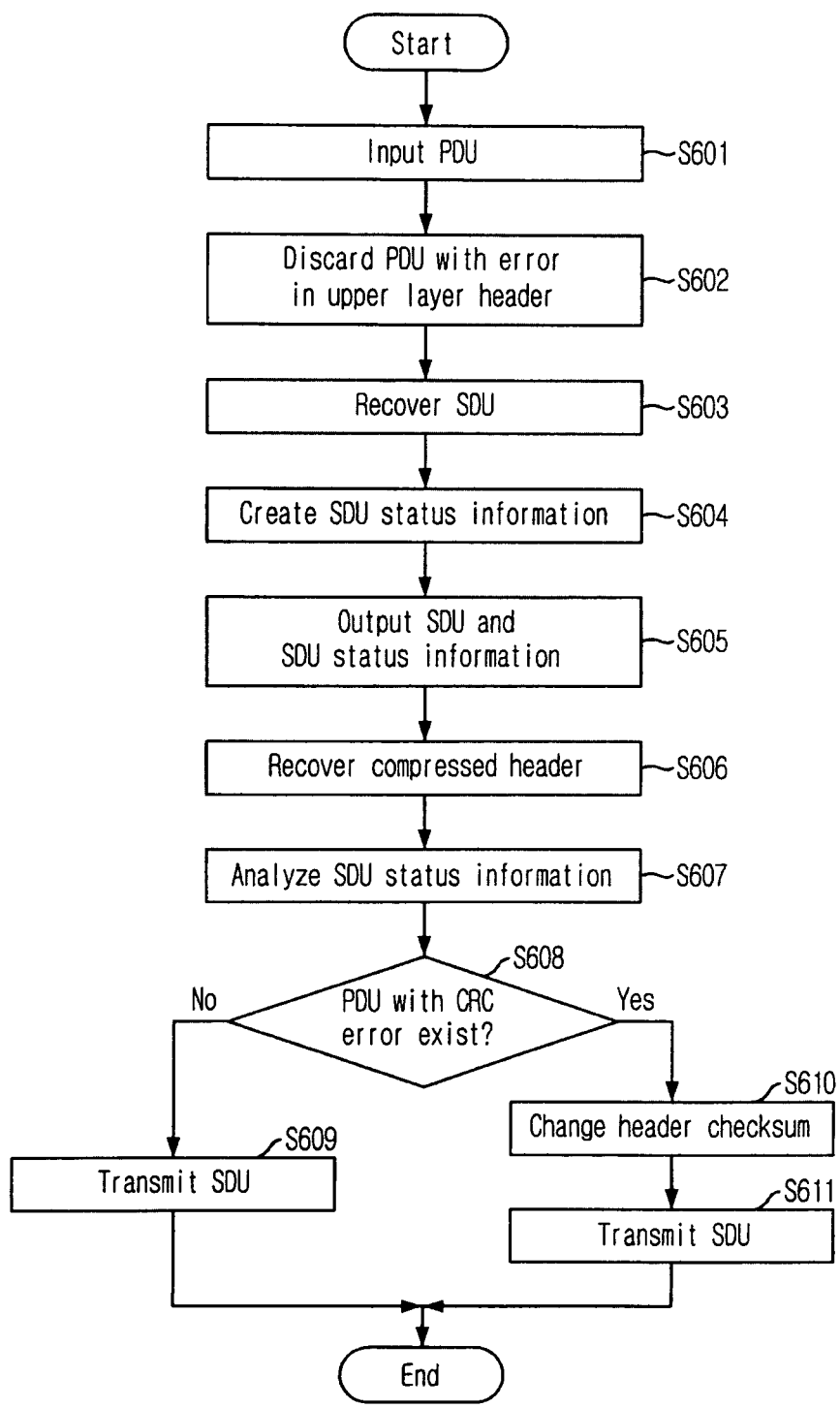
FIG. 6 is a flowchart describing an error correction process of an MBMS terminal in accordance with an embodiment of the present invention.

FIG. 6 is a flowchart describing an error correction process of an MBMS terminal in accordance with an embodiment of the present invention.

At step S601, the RLC processor 530 receives PDUs from the MAC processor 520.

Subsequently, at step S602, the RLC processor 530 groups the inputted PDUs into PDUs with a CRC error and PDUs without a CRC error, and discards PDU with the error in an upper layer header among the PDUs with a CRC error. In short, when a PDU with a CRC error includes an IP header, a UDP header, an RTP header, an FEC payload ID, the RLC processor 530 gets rid of the PDU.

Subsequently, at step S603, the SDU recovery unit 532 of the RLC processor 530 recovers SDUs from the PDUs.

Subsequently, at step S604, the SDU status information creating unit 531 of the RLC processor 530 creates SDU status information including information on whether the recovered SDU has a CRC error or not and information on the position of the CRC error.

At step S605, the RLC processor 530 outputs the recovered SDUs and the SDU status information to the PDCP processor 550.

At step S606, the header recovery unit 551 of the PDCP processor 550 recovers the compressed headers of the SDUs. Since header compression at the PDCP processor 550 of a transmitter is optional, the header recovery unit 551 recovers the compressed header only when the header is compressed.

At step S607, the PDCP processor 550 interprets the SDU status information inputted together with the SDUs and, at step S608, it is determined whether there is an SDU recovered from an erroneous PDU.

In case that there is no PDU with a CRC error, at step S609, the SDUs are delivered to the upper layer as they are. Herein, a packet header may be created and added to the SDU status information which informs that no SDU is recovered from a PDU with a CRC error.

Meanwhile, if there is a SDU recovered from a PDU with a CRC error, the SDU is not discarded by the UDP checksum checking unit 564 of the UDP processor 562, but the UDP header checksum of the SDU is modified to be delivered to the raptor decoding unit 563 at step S610. At step S611, the SDU is transmitted to the upper layer. Herein, a packet header informing the presence of an erroneous PDU may be created additionally and added to the SDU status information.

The method of the present invention can be realized as a program and stored in a computer-readable recording medium, such as CD-ROM, RAM, ROM, floppy disks, hard disks, magneto-optical disks and the like. Since the process can be easily implemented by those skilled in the art to which the present invention pertains, detailed description on it will not be provided herein.

While the present invention has been described with respect to certain preferred embodiments, it will be apparent to those skilled in the art that various changes and modifications may be made without departing from the scope of the invention as defined in the following claims.

What is claimed is:

1. A multimedia broadcast/multicast service (MBMS) terminal capable of correcting an error in reception data in an MBMS receiving system, comprising:
   a radio link control (RLC) protocol processor configured to:
   receive protocol data units (PDUs) generated from the reception data;
   identify received PDUs having an error;
   generate service data units (SDUs) by combining the PDUs;
   mark whether there is an SDU recovered from a PDU identified as having an error; and
   output the SDUs including SDUs recovered from PDUs identified as having an error; and a packet data convergence protocol (PDCP) processor configured to
receive the SDUs from the RLC protocol processer;
form a User Datagram Protocol (UDP) checksum for an SDU recovered from a PDU identified as having an error in order to prevent that SDU from being discarded in a UDP upper layer; and
deliver the SDUs to the UDP upper layer.

2. The MBMS terminal as recited in claim 1, wherein the RLC processor includes:
an SDU recovery unit configured to generate the SDUs by combining the PDUs; and
an SDU status information creating unit configured to generate SDU status information which includes information on whether there is an SDU recovered from a PDU with an error.

3. The MBMS terminal as recited in claim 2, wherein the SDU status information further includes:
erroneous PDU position information informing position of the PDU with an error.

4. The MBMS terminal as recited in claim 3, wherein the SDU status information further includes information on the size of the SDU status information.

5. The MBMS terminal as recited in claim 3, wherein the erroneous PDU position information includes:
first erasure PDU position information informing position of a PDU which is to be erased first; and
previous erasure PDU position information informing a relative position of a preceding PDU and next erasure PDU position information informing a relative position of a subsequent PDU,
where the erasure PDUs include an error therein.

6. The MBMS terminal as recited in claim 2, wherein the SDU recovery unit generates SDUs by combining an erroneous PDU with another PDU.

7. The MBMS terminal as recited in claim 6, wherein the SDU recovery unit discards a PDU with an error occurring in an upper layer header among the erroneous PDUs.

8. The MBMS terminal as recited in claim 7, wherein the upper layer header is any one among an Internet Protocol (IP) header, a User Datagram Protocol (UDP) and a Real Time Protocol (RTP) header.

9. The MBMS terminal as recited in claim 1, wherein the PDCP processor includes a packet generating unit configured to form the UDP checksum, wherein the packet generating unit forms the UDP checksum in a header of the SDU recovered from the PDU identified as having the error, and wherein the UDP checksum prevents that SDU from being discarded in the UDP upper layer by enabling that SDU to pass a UDP checksum test in the UDP upper layer.

10. The MBMS terminal as recited in claim 9, wherein the PDCP processor includes a header recovery unit for recovering a compressed header of the SDU.

11. A multimedia broadcast/multicast service (MBMS) terminal for correcting an error in reception data in an MBMS receiving system, comprising:
an SDU recovery unit configured to receive protocol data units (PDUs) generated from the reception data, and generate service data units (SDUs) by combining the PDUs;
an SDU status information creating unit configured to generate SDU status information including information on whether an SDU is recovered from a PDU with an error in the PDU, wherein the SDU recovery unit outputs, to a PDCP layer, the generated SDUs including SDUs recovered from PDUs having an error in the PDU; and
a unit positioned in the PDCP layer and configured to form a User Datagram Protocol (UDP) checksum for an SDU recovered from a PDU having an error in the PDU in order to prevent that SDU from being discarded in a UDP upper layer.

12. The MBMS terminal as recited in claim 11, wherein the SDU status information further includes:
erroneous PDU position information informing position of the PDU with an error.

13. The MBMS terminal as recited in claim 12, wherein the erroneous PDU position information includes:
first erasure PDU position information informing position of a PDU which is to be erased first; and
previous erasure PDU position information informing a relative position of a preceding PDU and next erasure PDU position information informing a relative position of a subsequent PDU,
where the erasure PDUs include an error therein.

14. The MBMS terminal as recited in claim 11, wherein the SDU recovery unit generates SDUs by combining an erroneous PDU with another PDU, and outputs the recovered SDUs to an upper layer along with the SDU status information.

15. The MBMS terminal as recited in claim 14, wherein the SDU recovery unit discards a PDU with an error occurring in an upper layer header among the erroneous PDUs.

16. The MBMS terminal as recited in claim 11, wherein the unit comprises a packet generating unit that is configured to form the UDP checksum in a header of the SDU recovered from the PDU having the error in the PDU.

17. The MBMS terminal as recited in claim 16, further comprising:
a header recovery unit for recovering a compressed header of the SDU.

18. A method for correcting an error in reception data in a multimedia broadcast/multicast service (MBMS) receiving system, comprising the steps of:
a) receiving protocol data units (PDUs) generated from the reception data;
b) generating service data units (SDUs) by combining the PDUs;
c) marking whether an SDU is recovered from a PDU with an error in the PDU, and outputting the SDUs including SDUs recovered from PDUs having an error in the PDU; and
d) forming a User Datagram Protocol (UDP) checksum for an SDU recovered from a PDU having an error in the PDU in order to prevent that SDU from being discarded in a UDP upper layer.

19. The method as recited in claim 18, wherein the step c) includes the steps of:
c1) generating SDU status information including information on whether there is an SDU recovered from an erroneous PDU; and
c2) outputting the SDU status information and an SDU corresponding to the SDU status information.

20. The method as recited in claim 19, wherein the SDU status information further includes:
erroneous PDU position information informing position of the PDU with an error.

21. The method as recited in claim 20, wherein the SDU status information further includes information on the size of the SDU status information.

22. The method as recited in claim 20, wherein the erroneous PDU position information includes:
first erasure PDU position information informing position of a PDU which is to be erased first; and previous erasure PDU position information informing a relative position of a preceding PDU and next erasure PDU position information informing a relative position of a subsequent PDU,
where the erasure PDUs include an error therein.

23. The method as recited in claim 19, wherein the SDU status information further comprises information on whether the error of the PDU is a bursty error or a random error.

24. The method as recited in claim 18, wherein the step b) includes the steps of:
   b1) discarding a PDU with an error occurring in an upper layer header among the erroneous headers; and
   b2) generating SDUs by combining an erroneous PDU with another PDU.

25. The method as recited in claim 18,
wherein the forming the UDP checksum comprises forming the UDP checksum in a header of the SDU recovered from the PDU having the error in the PDU, and wherein the UDP checksum prevents that SDU from being discarded in the UDP upper layer by enabling that SDU to pass a UDP checksum test in the UDP upper layer.

* * * * *